United States Patent [19]

Pfannkuch

[11] Patent Number: 4,652,941
[45] Date of Patent: Mar. 24, 1987

[54] METHOD AND SYSTEM FOR REAL TIME VIDEO TAPE DUPLICATING

[75] Inventor: Robert B. Pfannkuch, Chicago, Ill.

[73] Assignee: Bell & Howell/Columbia, Northbrook, Ill.

[21] Appl. No.: 709,752

[22] Filed: Mar. 8, 1985

[51] Int. Cl.$^4$ .............................................. G11B 5/09
[52] U.S. Cl. ..................................................... 360/18
[58] Field of Search ................ 360/15, 16, 17; 369/84

[56] References Cited

U.S. PATENT DOCUMENTS 3,679,842 7/1972 Ahy ....................................... 360/15

Primary Examiner—Vincent P. Canney
Attorney, Agent, or Firm—McDermott, Will & Emery

[57] ABSTRACT

The present invention provides a pancake duplicator for sequentially recording multiple copies of program material on a pancake reel of blank recording tape. The apparatus and method disclosed facilitate and economize the commercial preparation of large numbers of video tape copies of program material. The apparatus includes a video tape drive unit capable of handling large reels or pancakes of raw, unrecorded video tape and transferring the tape past a video recording head to a takeup spool whereby many copies of a particular program are recorded on the pancake. In an alternate form, the recording functions are performed by a conventional recording device using an integrated tape drive capable of transporting tape from a pancake past the recording head to a takeup spool at the appropriate rate. In this alternate form, the apparatus includes an extension which engages the video cassette receiving opening in the conventional, industrial video tape recording machine and includes a plurality of guide rollers to present the tape for appropriate wrapping about the video tape head of the recorder to emulate a cassette. Independent drives in the apparatus are connected by appropriate circuitry to provide the necessary transfer of the tape during the recording process.

2 Claims, 15 Drawing Figures

METHOD AND SYSTEM FOR REAL TIME VIDEO TAPE DUPLICATING

BACKGROUND OF THE INVENTION

1. Field of the Invention

This invention relates to video cassette duplication, and in particular to the commercial preparation of multiple video tape copies of program materials, such as movies, for rental or sale.

2. Description of the Prior Art.

With the advent of popular, affordable home video cassette recording machines the VCR, a new market has emerged for pre-recorded audio visual programs such as movies or music videos. Specifically, many consumers who own VCRs desire to rent pre-recorded movies and even collect a home library of audio visual programs for private viewing at convenient times. Although some consumers prefer to create their own home libraries by recording off the air, many VCR owners prefer to purchase or rent a professionally recorded copy of the programming material of particular interest to them, such as classic movies, plays, musical performances and the like which are unavailable on standard broadcast television.

Therefore, as a consequence of the availability of VCRs, the demand for high quality copies of original programming material in video tape cassette form has drastically and rapidly increased. Prior to the present invention, video cassette copies of original programming materials have been prepared by connecting a master source of the programming signals, typically a reel to reel tape recorder, to a multiplicity of "slave" commercial grade video cassette recorder. Each of the "slave" recorders are loaded with a cassette containing a suitable length of raw or blank video tape. Typically, the "slave" recorders are manually operated by individual operators in synchronism with the master source and monitored until the end of the programming material and substantially the full length of tape is recorded. After each cassette has been thus recorded, it is removed and a fresh blank cassette is installed in each "slave" unit. The master tape is reset to start a fresh run of the source programming material to make another "batch" of copies. The individual recorded cassette copies are then individually boxed and sent for distribution.

This prior art technique for preparing copies of original audio visual programming materials suffers from several disadvantages. Firstly, commercially available video tape cassettes are loaded with a supply of video tape sufficient to provide generally predetermined time increments of recording capability depending upon the speed of recording. The magnitude of these increments varies from as little as thirty minutes to as much as six hours, usually in one half hour increments. The actual incremental time value of the amount of tape in a particular cassette is partially a function of the actual amount of tape and partially a function of the recording speeds provided by the available consumer video cassette recorders. Except in rare instances, the actual recording time represented by the amount of tape in a given cassette never matches the length of the programming materials to be recorded. As a consequence, only a rough match can be made between the length of the blank video tape and the programming materials, with the result that often video tape is wasted in the cassette.

In addition, the cleanliness of video tape used in blank video cassettes varies widely depending upon the storage conditions as well as other factors, and may vary along the length of the tape within a given cassette. Since professionally recorded copies must have the highest fidelity in order to be acceptable in the marketplace, many defective cassettes may have to be discarded. This is very time consuming and wasteful, since rejected cassettes must be either discarded or sold as used merchandise.

Also, the preparation of copies by the use of "slave" cassette recorders greatly increase the labor cost involved, because each machine must be unloaded, loaded, and restarted simultaneously to make a second "batch" of copies. Typically, one hour of recording time is lost during this change over period.

SUMMARY OF THE INVENTION

The invention comprises a method and an apparatus for preparing video tape copies of original programming materials to be marketed in video cassette form by repeatedly taping the program source along the length of a very large reel or "pancake" of blank tape. The invention emulates a cassette with a very large reel or pancake of tape to be recorded. Much time is saved in the recording process because a change of cassettes in "slave" units is not required between each recording of the original program. Preferably, two master recording and playback units are provided so that a second master can be alternately employed for continuous recording while the first master is being rewound. The present invention also permits the length of the video tape in the cassette to be tailored to the length of the original programming material and guarantees the cleanliness of the blank tape prior to the duplicating process.

The apparatus of the present invention provides a tape transport mechanism capable of transporting blank tape from a pancake reel, typically 16,000 feet, to an open spool. Approximately 30 to 40 two-hour programs can be recorded on a single pancake of blank tape. The apparatus includes an extension plate, generally in the plane of the pancake, which is designed to be inserted into the cassette receiving opening of a conventional video cassette recorder. The conventional recording station of the recorder, accepts the extension plate, so that the mechanical and electronic elements of the recorder properly wrap the blank tape on the video recording head for repetitive duplication of source program materials on video tape supplied on pancake reel. The extension plate includes a tape guide block which engages the recording station region of the recorder to provide a substitute tape path for that normally provided by the video cassette when loaded in the recording position. The tape guide block is provided with a plurality of recesses which accommodate the standard tape positioning mechanical elements found in the recorder without interfering with the operation of these elements.

The guide block provides the condition signals normally generated by the cassette loading mechanism which has been removed, such as the elevator down and elevator up switches, as well as the normal cassette supply and takeup reel tachometer signals through an electronic interface so as to emulate the operation of the removed elements. The pancake tape transport is provided with a pair of tape wipers to insure clean tape surfaces slightly upstream of the recording region, as well as a standard tape packer mechanism for optimizing the winding of the recorded tape about the pancake transport takeup reel.

Briefly, the invention comprises a pancake tape transport assembly which mates to the cassette receiving opening of a conventional video cassette recorder. The transport including a supply reel, a takeup reel, motors for driving each reel, and tape guide elements providing a tape path between the supply and takeup reels. The tape guide elements include a tape guide plate which is inserted into the recording station of the standard recorder for providing a substitute tape path adjacent the mechanical and electronic recording elements of the recorder. An electronic interface is provided which receives status and condition signals from the conventional recorder, and which furnishes certain conditioning signals to the conventional recorder to emulate the performance of those portions of the recorder which have been removed or disabled. In the preferred embodiment, the status and function signals provided from the recorder to the electronic interface unit are play, stop and eject function signals and the auto stop status signal while the conditioning signals supplied from the interface unit to the recorder are the auto stop condition signal, elevator up and down condition signals and supply and takeup reel tachometer signals. The electronic interface unit includes a logic unit which receives the status and function signals from the conventional recorder and provides the stop, up and down condition signals to the recorder and a pair of identical supply tension units which control the reel motor operation and supply the tachometer signals to the reel lock detection circuitry of the recorder. The logic unit provides run and start control signals to each tension unit, and further provides brake solenoid actuation signals for each motor in response to the input function and condition signals supplied to the logic unit from the recorder. In addition, the logic unit provides control signals for operating independent stop and ready condition lamps which are mounted on the recorder.

The invention enables many high quality duplicates of programming material to be made from a master source of such material, the duplicate copies being recorded on the video tape unreeled from the pancake supply reel and wound about the pancake takeup reel after the tape is passed through the recorder recording station. Depending on the length of tape installed on the pancake supply reel of the duplicator unit, multiple copies of the source programming material can be made in serial fashion with each machine. In addition, several duplicator units can be operated in parallel with the master unit to provide multiple parallel recording of multiple copies of the source materials. After each duplicator unit has prepared the requisite number of copies, the recorded pancake reel of tape is removed from each duplicator unit and separated into individual lengths of video tape each containing the entire sequence of programming materials, and the separated tape lengths are installed in a standard video cassette for distribution.

Since the invention employs pancake reels of video tape, no time is lost inserting blank cassettes into "slave" units and the cleanliness and quality of the blank tape can be more closely controlled to guarantee high fidelity for each recorded duplicate. In addition, since the length of tape used to record the source programming material is equal to the running time of the material, no video tape is wasted in the duplicating process according to the present invention.

For a full understanding of the nature and advantage of the invention reference should be had to the ensuing detailed description, taken in conjunction with the accompanying drawings.

DESCRIPTION OF THE PREFERRED EMBODIMENT MECHANICAL SECTION

The present invention is a pancake duplicator which is capable of serially recording multiple copies of a particular video program on a large reel or pancake of blank videotape. The pancake is subsequently cut into segments whereby each copy of the program is wound into an empty cassette.

Figure 1:
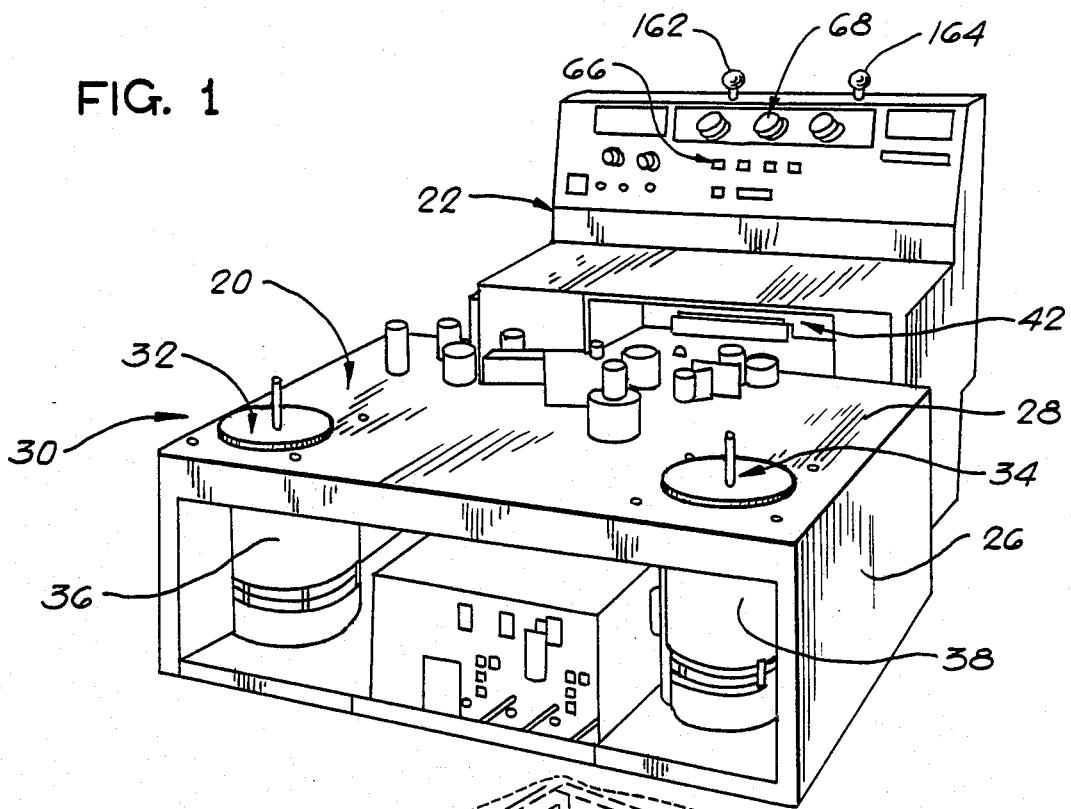
FIG. 1 is a perspective view of the present invention shown mated with an industrial grade video cassette recorder.
Figure 2:
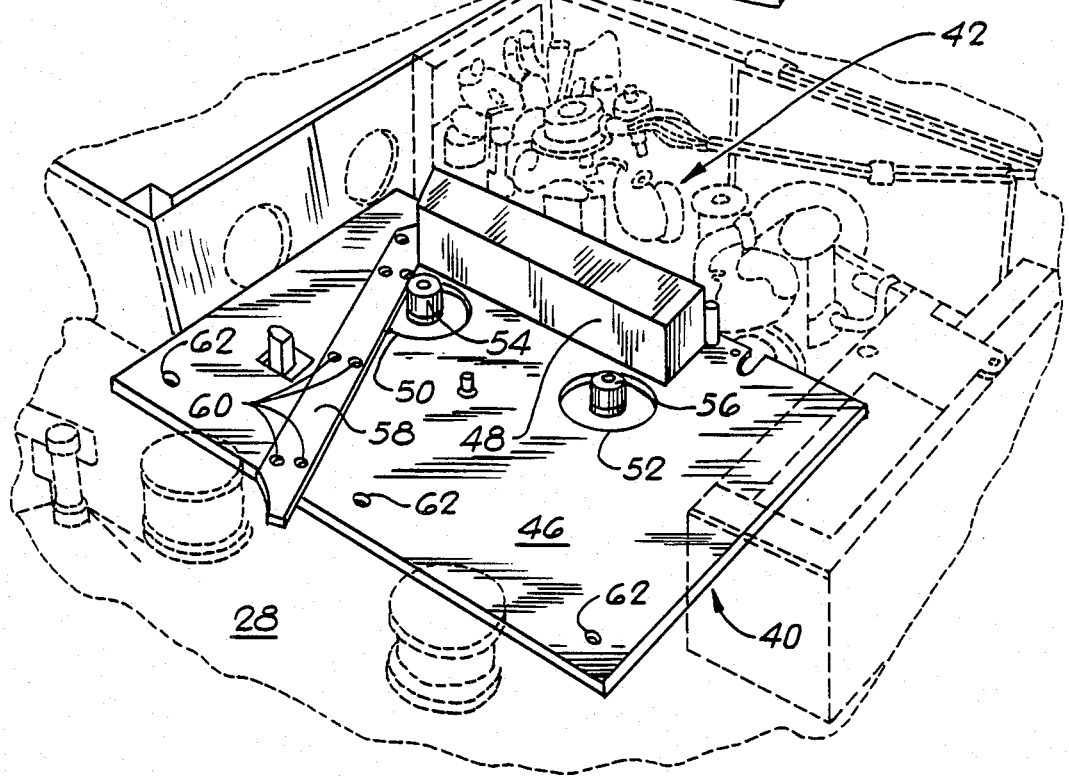
FIG. 2 is an enlarged perspective view of an extended portion of the invention which provides tape transport path through the video cassette recorder of FIG. 1.

Referring now to the drawings, and in particular to FIG. 1, the present invention, generally designated 20, is shown ready for use in that it is mated to a conventional industrial grade video cassette recorder, generally designated 22. Although the specific type of recorder 22 is unimportant to the present invention, for illustrative purposes, the recorder 22 shown in FIG. 1 is a Panasonic model AG-6800 industrial grade video cassette recorder. Although this recorder is designed to accept a ½ inch VHS cassette, other formats and tape sizes are equally capable of adaptation to the present invention.

The invention 20 includes a generally rectangular housing 26 and a top working surface or deck 28 upon which a pancake transport system 30 is mounted. The tape transport system 30 is capable of handling large reels or pancakes of video tape which may be up to 16,000 feet or longer in length. The blank video tape or raw stock is supplied in pancake form which does not require the use of flanges on a reel to maintain its shape. The pancake transport 30 has a supply reel 32, a takeup reel 34 and corresponding servo motors 36 and 38 for driving the reels. A plurality of tape guides are also mounted on the top surface 28 as described in greater detail hereinafter.

At the rearward end of the top surface 28, the invention 20 includes an extension 40 which is received by the cassette receiving opening 42 at the recording station of the conventional recorder 22. The extension includes a guide plate 46 having a tape guide block 48 secured to its inner end and a pair of apertures 50 and 52 which accommodate and supply clearance apertures through which the tape cassette supply reel hub 54 and tape cassette takeup reel hub 56 of the recorder 22 extend. These clearance apertures 50 and 52 permit the use of the conventional recorder 22 without requiring the removal of the hubs 54 and 56 even though these hubs are not used in accordance with the present invention. A tape guide 58 extends from the platform 28 to the tape guide block 48 and is secured to the guide plate 46 by suitable fasteners 60. The purpose of the tape guide plate 46, tape block 48 and guide 58 is to provide a path of travel for the tape from the pancake to the tape recorder 22 for wrapping about the video tape head to thereby emulate the guide path afforded by a conventional video cassette without requiring any substantial modifications to the mechanical components of the recorder 22 to permit multiple copies of a program to be recorded throughout the length of the pancake.

As previously described, the extension 46 is secured to the platform 28 by suitable fasteners 62 so that it extends past the rearward end of the housing 26. The guide plate 46 is thus designed to enter the cassette receiving opening 42 of a conventional industrial grade video cassette recorder 22. The recorder 22 includes a plurality of pushbuttons generally designated 66, providing the customary start, stop, record, playback and pause functions and a plurality of monitor lamps generally designated 68 indicate the function currently being performed by the recorder. The recorder 22 is slightly modified for use with the present invention by removing the cassette cradle and elevator mechanism from the cassette receiving opening 42 so that the guide plate 46 can be inserted therein. With this minor modification to the recorder 22, the invention 20 emulates a cassette for recording on the recorder 22 but wherein the cassette can supply a continuous length or reel of tape in the pancake form.

Figure 3:
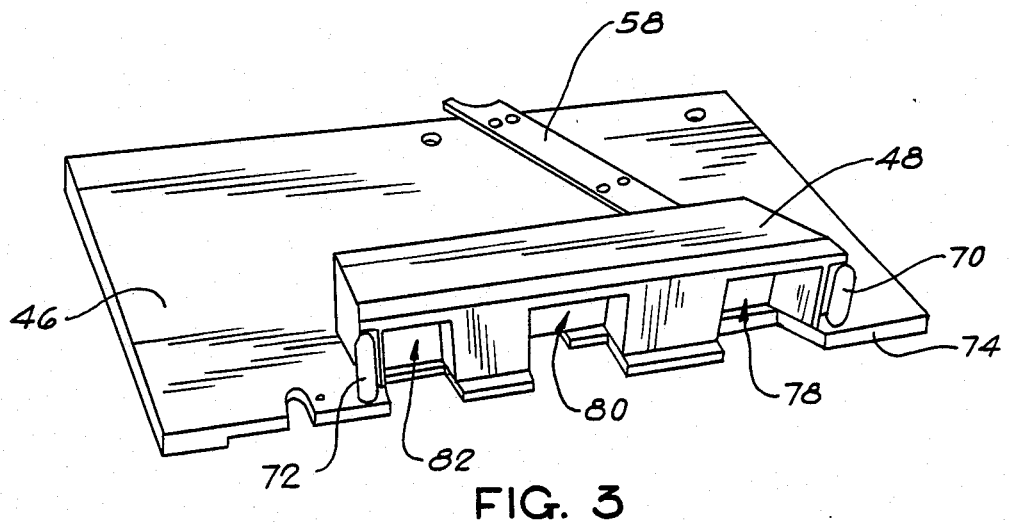
FIG. 3 is a enlarged perspective view of the tape guide plate and block from the recording station end.
Figure 5:
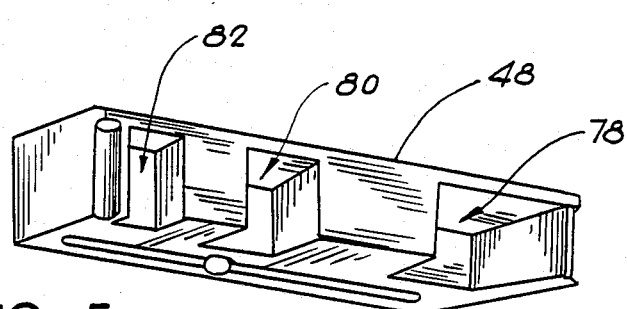
FIG. 5 is a perspective view of the tape guide block taken from the underside as viewed from the recording station.
Figure 4:
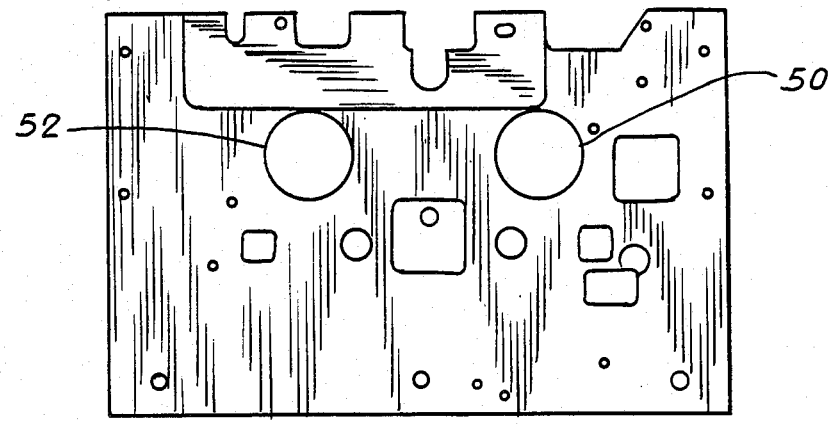
FIG. 4 is a bottom plan view of the tape guide plate.
Figure 6:
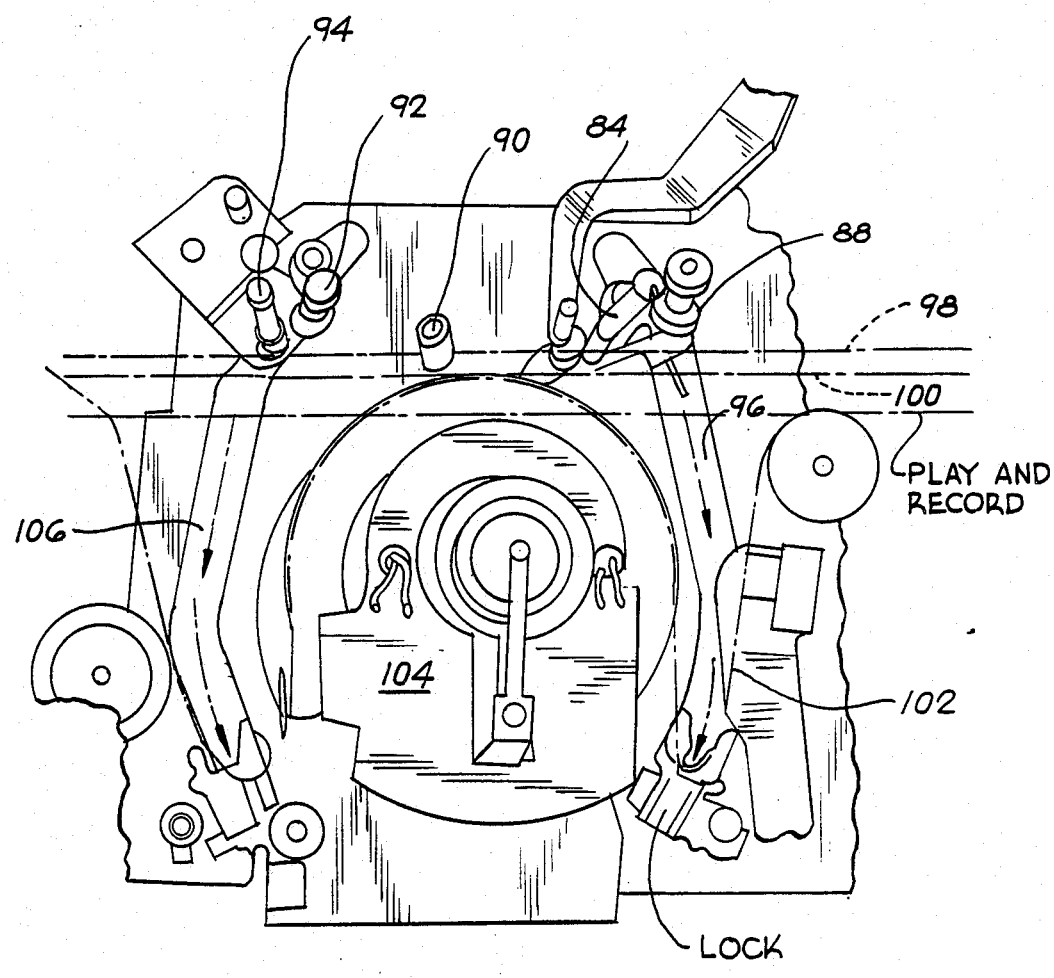
FIG. 6 is a generally schematic view showing the tape loading elements in the conventional video cassette recorder.

As best seen in FIGS. 3-5, a pair of tape guides 70 and 72, generally in the form of vertical posts, are mounted on the tape guide plate 46 adjacent the innermost edge 74 and spanning the distance across the tape guide block 48. In addition, the tape guide block 48 includes three cutout portions or recesses 78, 80 and 82 for accommodating the movable tape threading element of the conventional recorder (as shown in FIG. 6) without interfering with the operation thereof. More particularly, referring to FIG. 6, recess 78 accommodates the tape slant post 84 and tape guide 88 mounted at the inlet side of the recording station. Recess 80 accommodates the stationary guide post 90 and recess 82 accommodates the tape slant post 92 and the tape guide 94 mounted at the outlet side of the recording station. Slant post 84 and guide post 88 are movably mounted for operation along a path 96 from the retracted position illustrated in full in FIG. 6 (the tape thread position with the tape position illustrated with the broken line segment 98), to the tape ready position illustrated by the phantom line 100, and to the tape fully loaded position illustrated with the phantom line 102 in which the recording tape is wrapped approximately 270° around the outside surface of the rotatable drum 104 which carries the recording and playback heads of the video cassette recorder 22. Similarly, the tape guides 92 and 94 are movably mounted along a path 106 for similar motion in sychronism with the guides 84 and 99. Since the operation of these elements is conventional, further explanation herein is deemed unnecessary.

Figure 7:
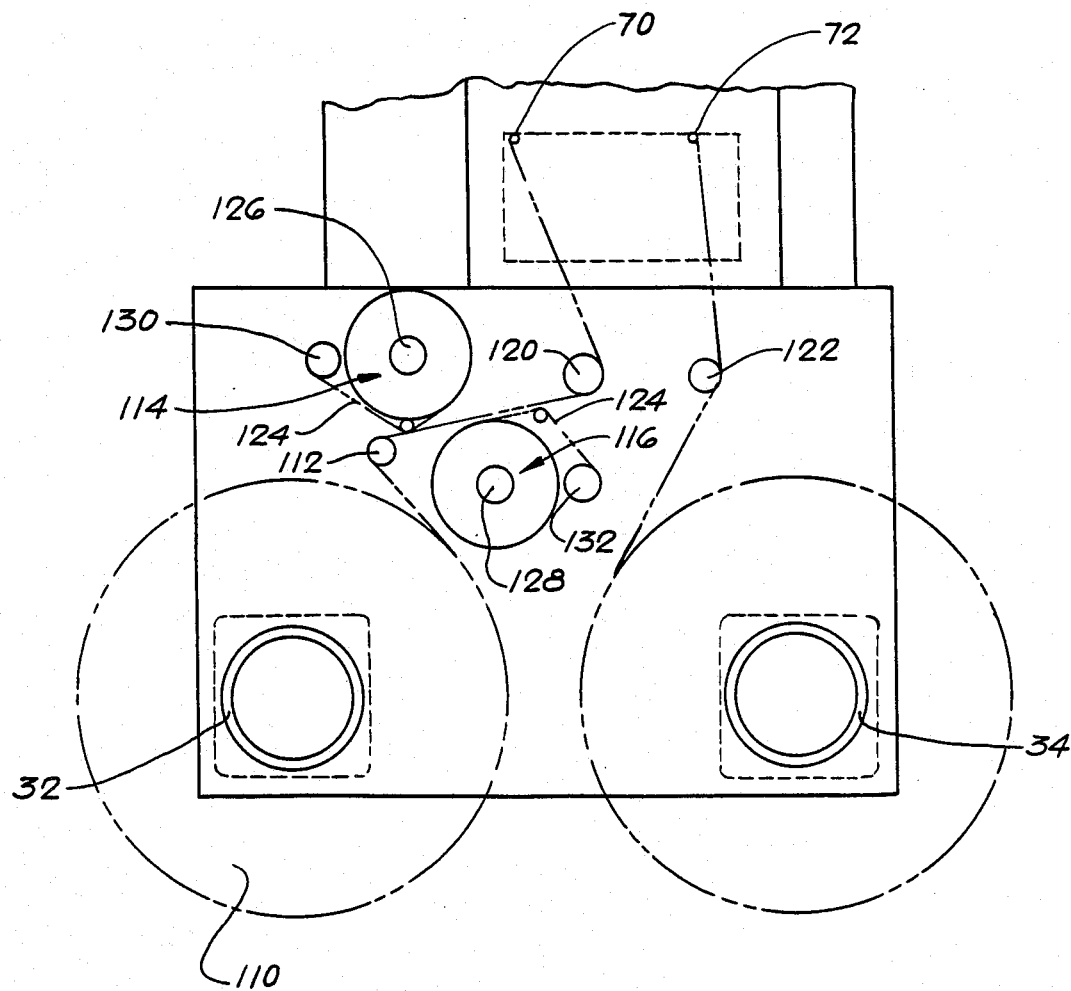
FIG. 7 is a schematic plan view showing the relative size of the supply and takeup pancakes, and the tape transport path.

FIG. 7 illustrates the schematic plan view of the total tape travel path from the pancake supply reel 32 to the pancake takeup reel 34. As seen in FIG. 7, a supply of video tape 110 in pancake form (shown by phantom line) extends from supply reel 32 to a first guide roller 112, past a pair of conventional tape wiper stations 114, 116, around a guide 120, past tape guides 70, 72, past guide roller 122 and about takeup hub 34. Tape wiper stations 114, 116 are conventional elements which contain a flexible web 124, arranged to be transported between supply and takeup reels 126, 130 and 128, 132 in a direction of motion opposite to that of the tape in order to remove oxide particles from the recording side of the tape and chaff, dust and other debris from both the recording and the smooth side of the tape. Similarly, elements 112, 120 and 122 are conventional tape guide devices and no further description is required.

Figure 8:
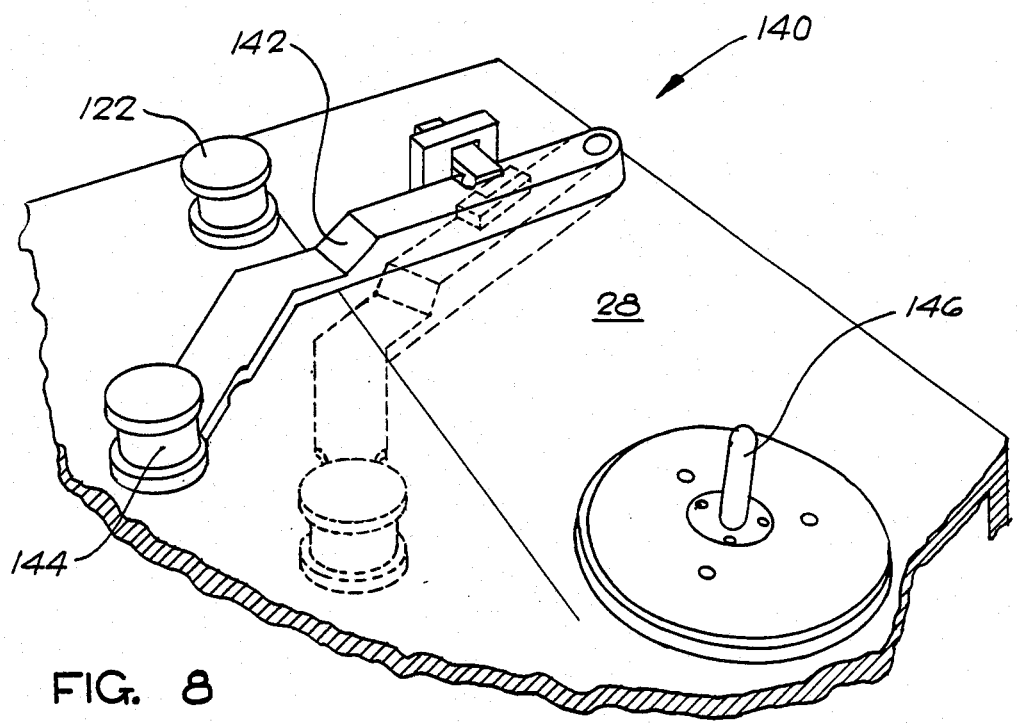
FIG. 8 is a partial perspective view showing the tape packer arm assembly for the takeup reel.

For simplicity, the tape packer assembly 140 associated with the takeup reel has been omitted from FIG. 1 and FIG. 7. The basic elements of the assembly 140 are shown in FIG. 8 and include a movable arm 142 pivotably arranged above the surface of the deck plate 28 and having a packer guide 144 mounted at the free end thereof for applying pressure against the outermost layer of the video tape accumulating about a hub mounted on the takeup spindle 146. Arm 142 is mechanically biased by conventional means (not shown) to provide a suitable packing force for the tape accumulating on the takeup spindle 146. The system is designed in such a manner that relatively constant tension is provided to the video tape throughout the tape path.

In use, a wound length of blank video tape is installed on the supply reel 32, threaded through the tape path depicted in FIG. 7 and wound about takeup spindle 146 with packer head 144 providing a frictional and guiding force to the tape surface to enable the tape to be wound about a hub on the spindle 146. Thereafter, the electronic portion of the system is operated in the manner described below so that the tape is unreeled from supply reel 110 along the tape path and out to takeup reel 34, while operating the recorder 22 to record the programming material supplied from a master source (not shown) to the standard video input connections for the recorder.

Figure 9:
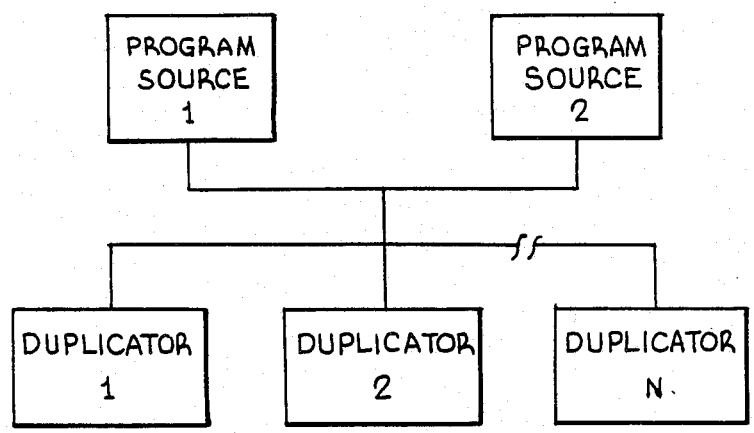
FIG. 9 is a schematic block diagram illustrating use of the invention.

FIG. 9 illustrates in block diagram form a typical connection between a signal program source and a plurality of modified recorder units of the type described above. As seen in this Fig., the video output from a first and second Program Source is coupled in parallel to the video input of each one of a plurality of pancake duplicator units. To ensure uniform signal strength to each duplicator unit, a video amplifier and splitter may be employed, as desired. In use, each duplicator unit is provided with an appropriate supply of blank video tape in pancake form on each supply reel 32, and the tape is threaded through the tape transport path to the takeup reel 34 of each unit. Each duplicator is then placed in the record/pause mode. Thereafter, each duplicator is actuated to commence recording in synchronism with the program source. After the entire program has been recorded on each duplicator unit from the first program source, the first program source is deactivated and the second program source is actuated to provide continuous recording on the pancakes on the duplicators. During this time period, the first program source is rewound, if it is a tape, or otherwise reset for reactuation after the second program source has been completed. This process continues until the pancakes are fully recorded.

The previous description is the most efficient method for recording, however, some users may have only one unit to serve as a program source. If this is the case, after the program source has been recorded the duplicator units are placed in the pause or stop mode, the program source is rewound or reset and the duplicator units and program source are synchronously started to record the same program material on the next length of video tape. With each method, after the requisite number of copies have been made on each duplicator unit, the pancake reels are removed from the takeup reels 34, and each of the duplicates from the pancake reels are automatically cut and inserted into a video cassette using conventional equipment, such as the "King" Cassette Loader. To assist in the cassette tape loading operation, edit cues may be inserted between the end of a program copy and the beginning of a program copy on each pancake reel. Once loaded, the video cassettes are packaged and then distributed.

ELECTRONIC SECTION

Although the present invention contemplates the use of the pancake drive transport with a specially designed recording portion, for simplicity, it has been described herein mated with a commercially available tape recorder 22. Certain modifications to the circuitry of the tape recorder 22 are provided for easy operation.

Figure 10:
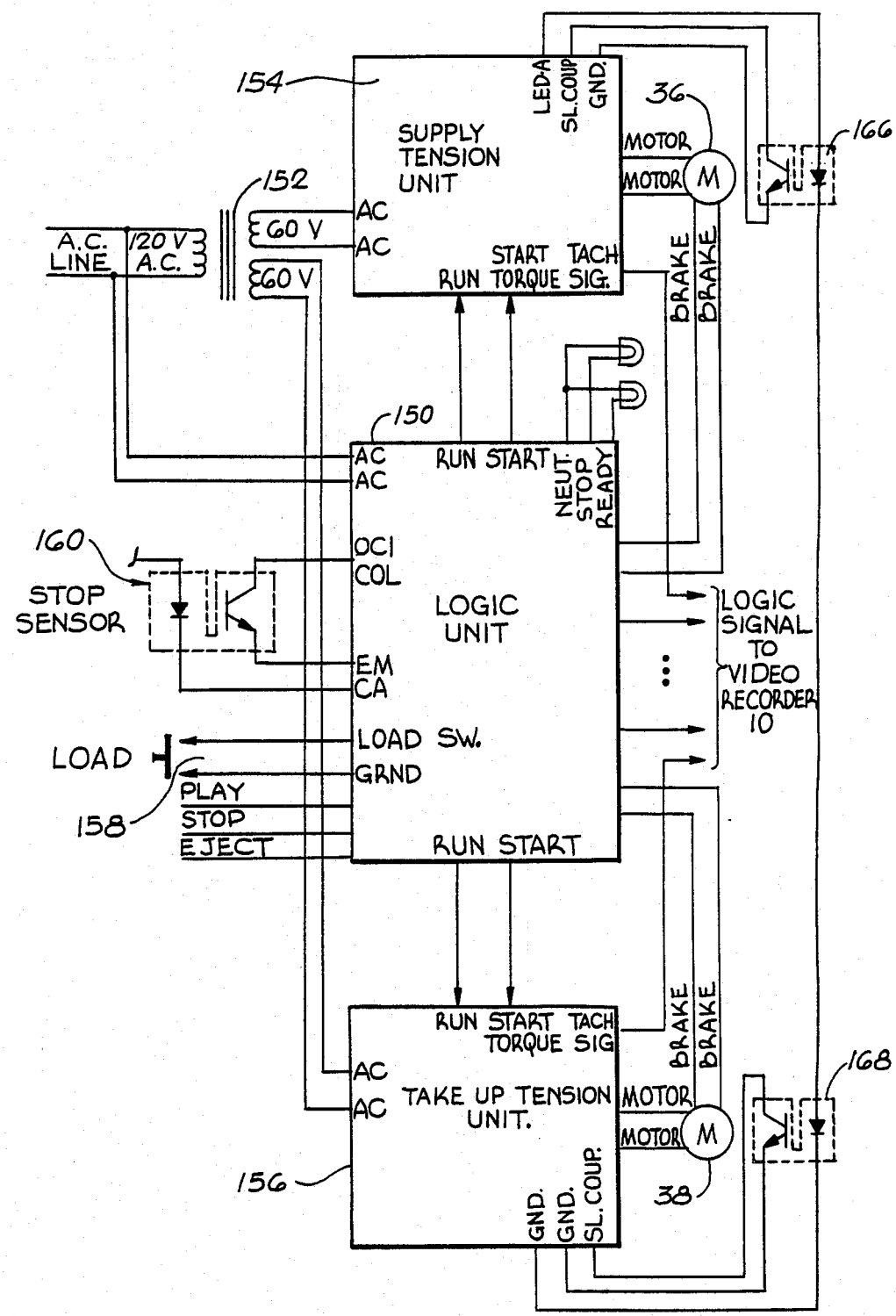
FIG. 10 is a block diagram of the electronic system incorporated into the invention.

FIG. 10 illustrates in block diagram form the electronic circuits used to interface the invention 20 with a conventional tape recorder 22 electronics with the pancake tape transport system of the present invention 20. As seen in FIG. 10, AC voltage is supplied directly to a logic unit 150 illustrated in detail in FIG. 14, while a step down transformer 152 supplies one-half the AC voltage to a pair of identical tension units 154, 156 depicted in detail in FIG. 15. Logic unit 150 had a first input connected to a momentary contact load switch 158, which is a function switch located on the control panel of recorder 20. Logic unit 150 has additional inputs for receiving play, stop and eject condition signals generated by the electronics position of recorder 22. In addition, logic unit 150 has an input signal generated by an optoelectronic coupler 160 which monitors the state of a stop lamp (one of lamps 68 on recorder 22) and functions to generate a stop sensor signal indicating that the recorder is in the automatic stop mode.

Logic unit 150 generates run and start control signals, which are coupled to tension units 154, 156, and a plurality of control signals (described below with reference to FIG. 11) which are coupled to the electronics section of the recorder 22. In addition, logic unit 150 generates control signals for a stop lamp 162 and a ready lamp 164, which are mounted on the control panel of recorder 22. Further, logic unit 150 generates a pair of brake signals for the supply motor 36 and takeup motor 38.

Figure 15:
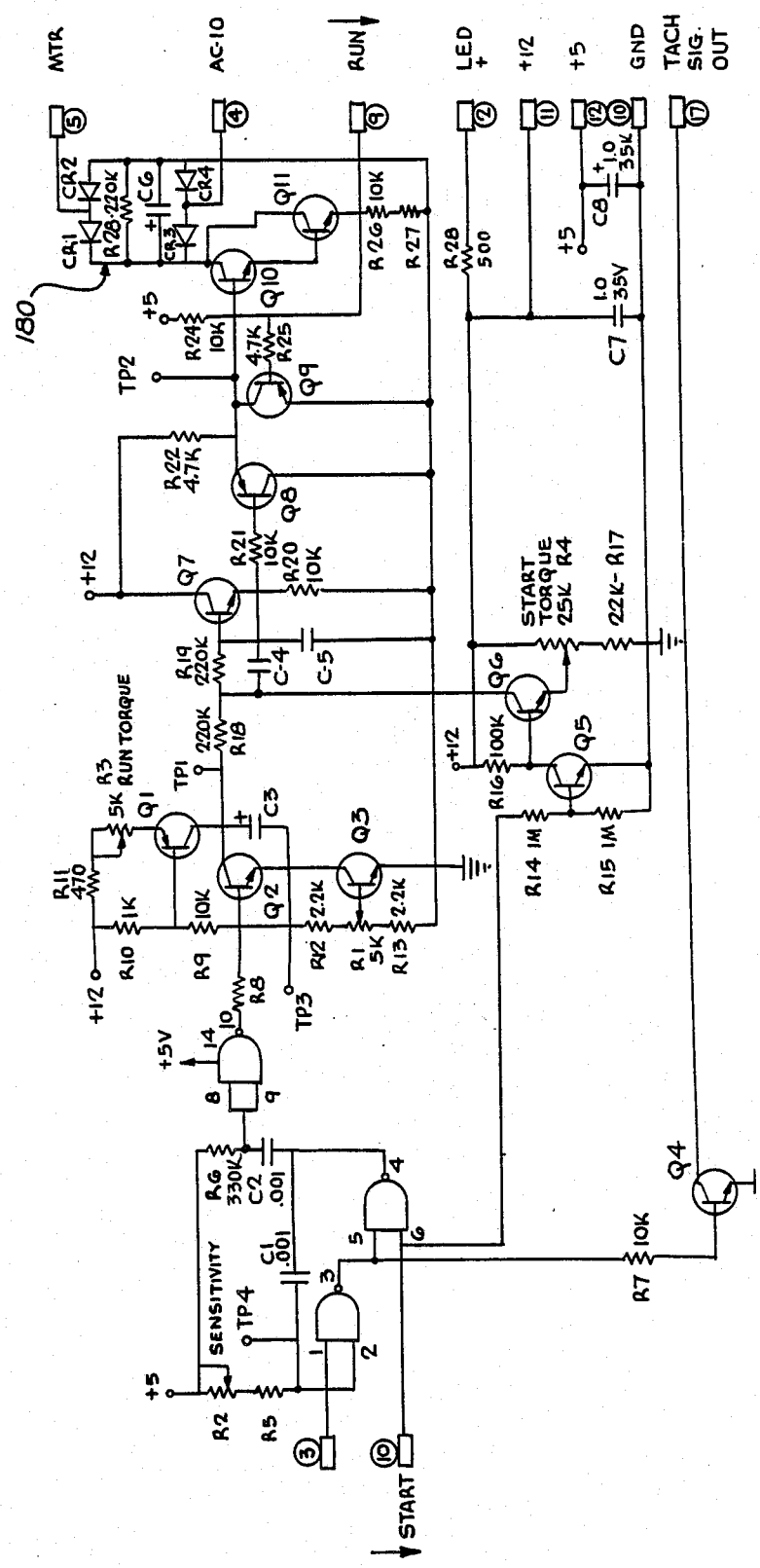
FIG. 15 is a schematic diagram of the tension unit portions of FIG. 9.

Supply tension unit 154 generates AC motor power signals for motor 36, and receives speed feedback signals from an optoelectronic tachometer 166 mounted to the bottom of motor 36. Takeup tension unit 156 functions in an identical manner with respect to motor 38 having a tachometer 168. As noted above, a complete circuit diagram of each tension unit is shown in FIG. 15.

Each tension unit 154, 156 supplies an individual tachometer signal to the electronic portion of video recorder 22. Not depicted in FIG. 15 is one of the 60 volt AC connections, which passes directly from transformer 152 to one side of motor 36 and motor 38: the remaining connection in the 60 volt AC circuit is depicted to the right of FIG. 15.

Figure 11:
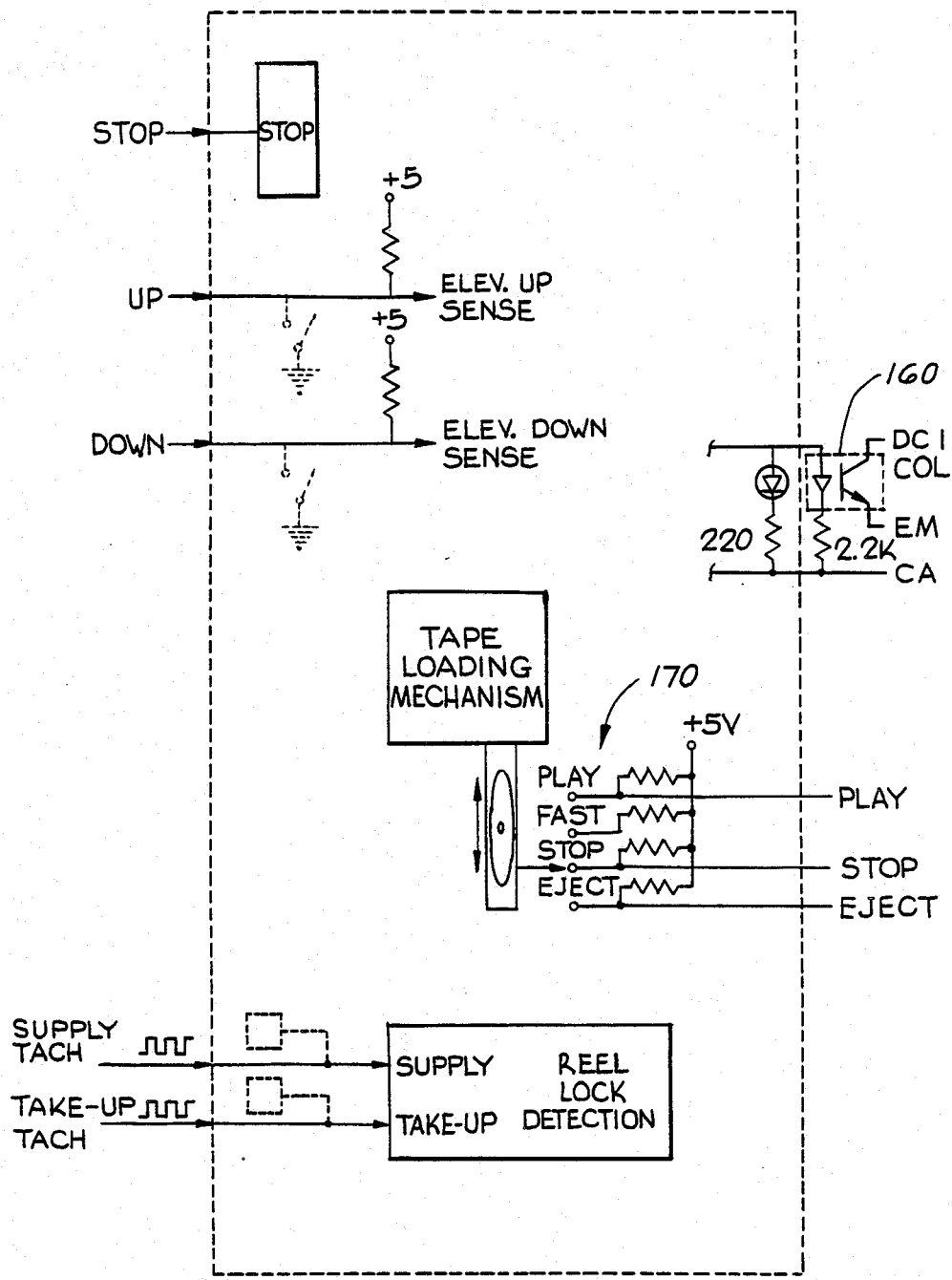
FIG. 11 is a schematic block diagram of a portion of the standard video cassette recorder electronics showing pertinent input and output signals.

FIG. 11 illustrates the control signals supplied to the relevant portions of the electronic section of the video recorder 22, as well as the status and function signals supplied form the recorder 22 to the logic unit 150. As seen in FIG. 11, the recorder 22 incorporates the optoelectronic stop sensor 160. In addition, the play, stop and eject function signals, which are generated by a four position slide switch 170 incorporated into the recorder 22 are generated by recorder 22 whenever the unit is in the play, stop and eject modes. The fast mode function signal is ignored by the logic unit 150.

The supply tach signals and takeup tach signals are supplied respectively from the supply tension unit 154 and takeup tension 156 to the reel lock detection circuit portion of recorder 22 and supplant the same signals normally supplied to the recorder 22 electronics from supply and takeup tach generators which monitor the speed of the cassette supply hub 54 and takeup hub 56.

Coupled from the logic unit 150 to the electronic portion of recorder 22 are three conditioning signals: stop, up and down. The stop signal is generated by the logic unit 150 in response to activating signals OC1 COL, EM and CA received from stop sensor 160. This signal is used by the recorder 22 to stop the operation of the recorder whenever the recorder automatic stop light is illuminated.

The up and down condition signals are coupled respectively to the elevator up and elevator down sense circuitry incorporated in the recorder 22 and furnish signals which emulate the operation of these two sense circuits. The up and down signals are synthetically generated by logic unit 150 in response to actuation of the load switch and the eject switch, respectively, and are required since the conventional cassette elevator mechanism has been removed from the recorder 22.

Figure 12:
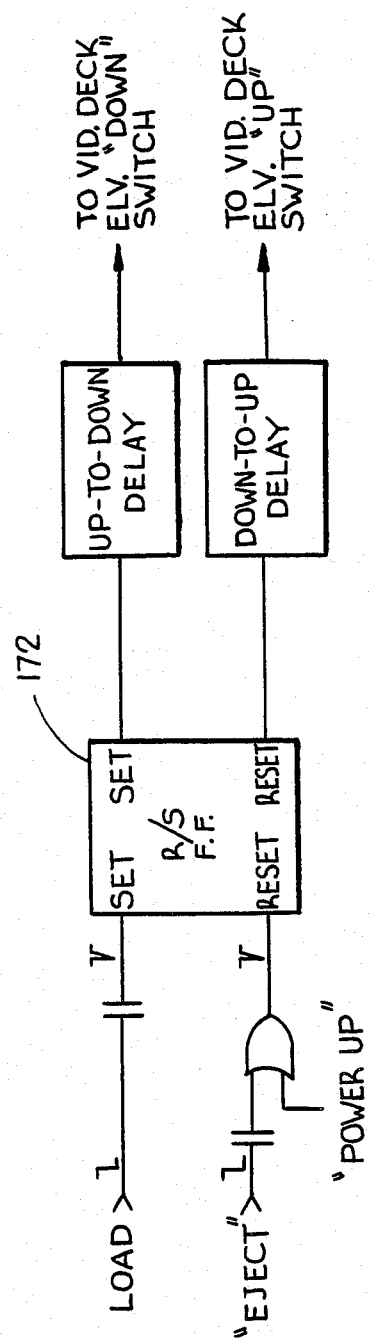
FIG. 12 is a block diagram of the elevator mechanism simulator portion of the system of FIG. 9.
Figure 13:
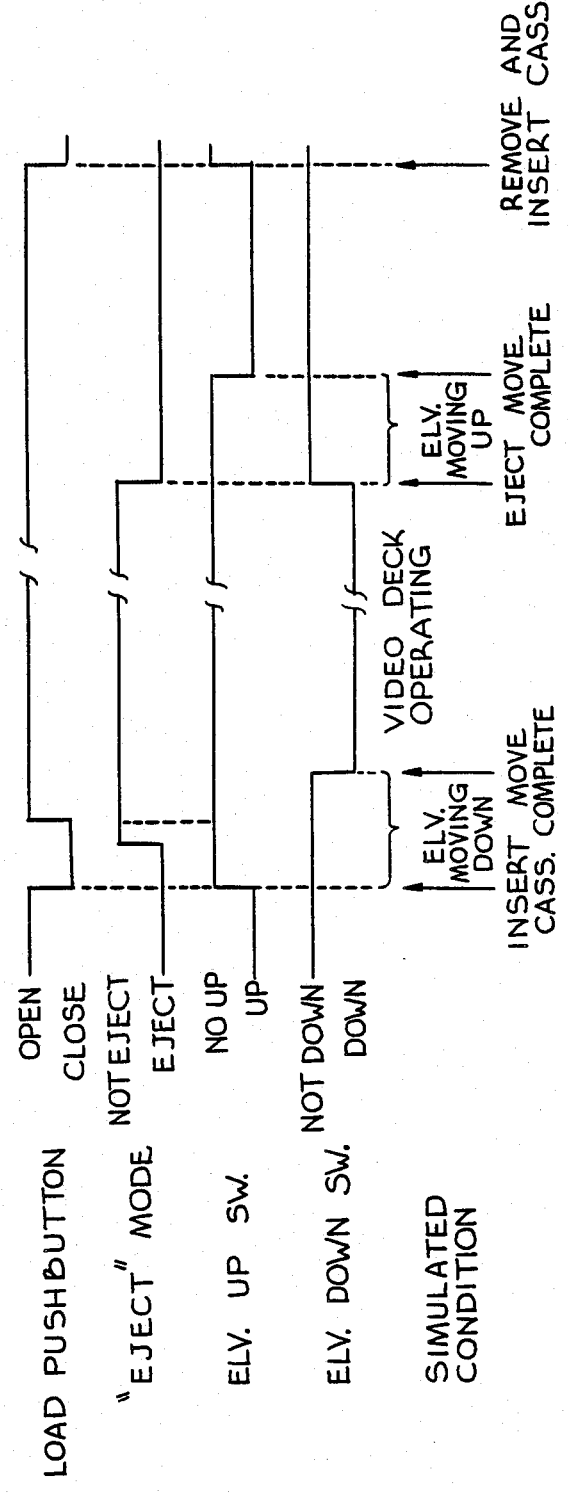
FIG. 13 is a timing diagram illustrating the operation of the FIG. 11 simulator.

FIG. 12 illustrates in block diagram form the up and down signal generating portion of logic unit 150. Essentially, upon power up a flip flop 172 is automatically reset. Thereafter, when the load switch is depressed, the flip flop 172 is set and the set output is subjected to a fixed delay which simulates the time after insertion of the cassette required for the elevator mechanism to move down to the loaded position. After the lapse of this fixed delay, the down condition signal is generated and supplied to the elevator down sense circuit of recorder 22. Similarly, whenever the eject switch is operated, flip flop 172 is reset and the reset output is subjected to a fixed delay which emulates the period of time required for the elevator to normally move up to the unload cassette position, after which time the up signal is supplied to the elevator up sense circuit.

Figure 14:
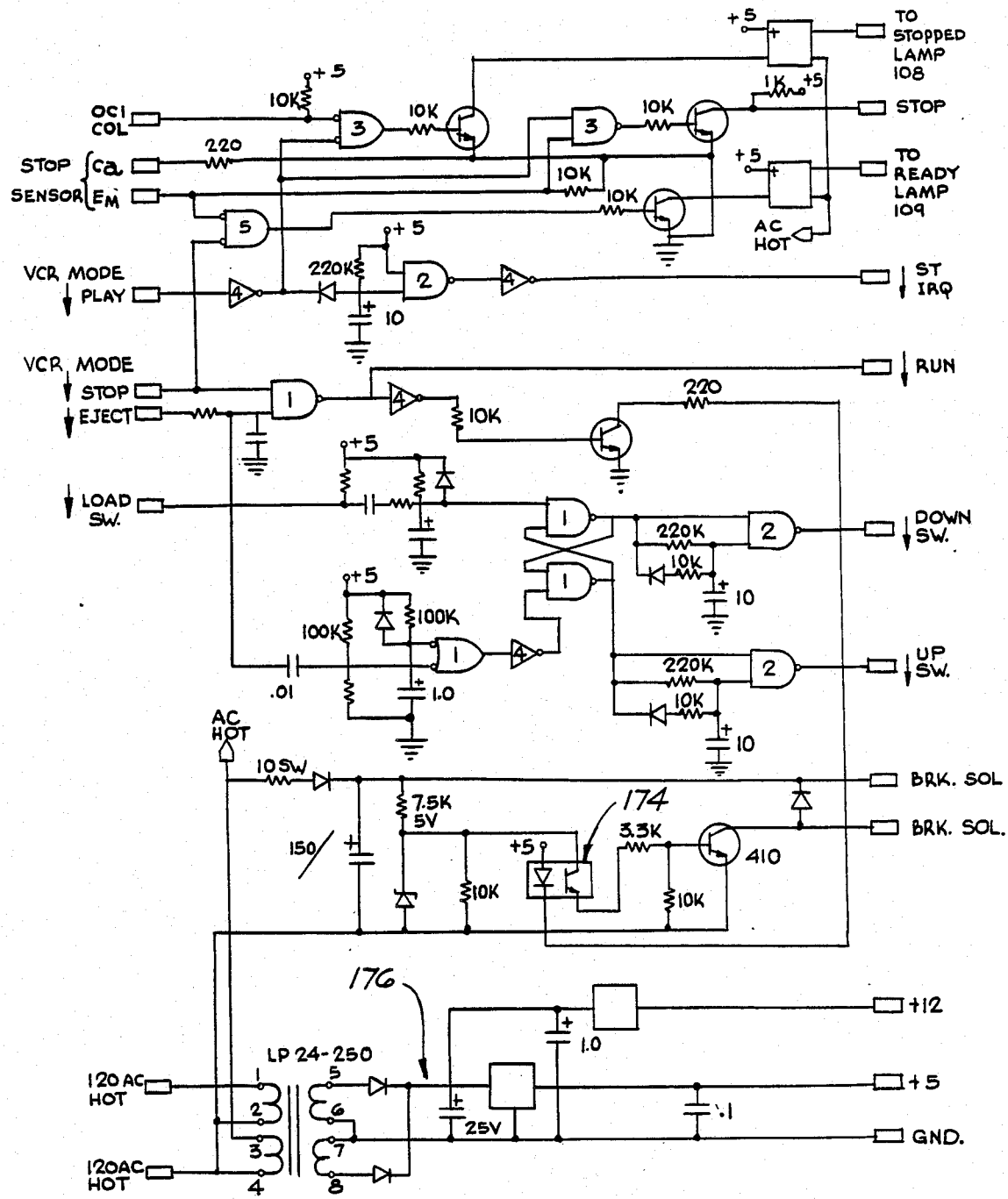
FIG. 14 is a logic diagram of the logic unit portion of FIG. 9.

With reference to FIG. 14, the start torque signal is generated by logic unit 150 whenever the play function switch on recorder 22 is actuated to the play position. The run control signal is generated whenever the stop and eject function switches are both inactivated. The brake solenoid actuation signals are generated whenever the stop or the eject function switches are in the actuated position. Since the brake solenoid actuation signals are AC, while the logic unit 150 employs low level DC signals, an optocoupler 174 is used to isolate these two types of signals. Lastly, logic unit 150 is provided with a rectifier circuit generally designated with reference numeral 176 for generating 12 volt DC and 5 volt DC power signals employed by the various circuit elements shown in FIGS. 14 and 15.

With reference to FIG. 15, tension control of each motor 36, 38, is supplied by a tension control bridge circuit generally designated with reference numeral 180 which provides DC control of the AC load through each motor 36, 38. The motors are AC induction type with variable current torque control. For ideal operating conditions, the torque supplied to each motor should be approximately 22 gms.

As will now be apparent, the invention provides a convenient technique for duplicating source programming material which is efficient and relatively low in cost. For example, the cost of modifying an industrial grade video cassette recorder 22 in the manner described to mate with the present invention 20 is substantially less than the cost of manufacturing a special purpose machine for the duplicating process. In addition, quality control of the video tape used for the duplicate copies can be assured by obtaining only high quality, clean, blank video tape from a video tape manufacturer, or by ordering to custom specifications the video tape from the tape manufacturer. If desired, an inspection step may be performed on the pancake reels of the video tape prior to installation on each duplicator unit. In addition, each duplicate copy only requires a length of tape which is equal to the total running time of the source programming material (plus a small header and trailer portion), so that literally no video tape is wasted in the preparation of the duplicate copies. Further, the time and labor expense normally wasted loading and unloading "slave" units is substantially reduced by the present method.

While the above provides a full and complete disclosure of the invention, various modifications, alternate constructions and equivalents may be employed without departing from the spirit and scope of the invention. For example, other model tape recorders may be employed for modification, if desired. In addition, the control panel may be installed on the front portion of the pancake tape transport, if desired. Therefore, the above should not be construed as limiting the invention, which is defined by the appended claims.

What is claimed is:

1. A system for enabling real time recording on video tape of video programming material supplied by a master using a modified conventional video cassette duplicator, said system comprising:
   a housing;
   a pancake supply and takeup reel tape transport means on the housing;
   a tape path means coupled to said tape transport for providing a substitute tape path in the video cassette duplicator recording station for the normal cassette tape path, said tape path means including a generally lateral extension on the housing for supporting said tape in the substitute tape path in the cassette receiving opening of the recording station;
   an electronic control system and interface for receiving function and status signals normally found in said video cassette duplicator and for supplying conditioning signals to said video cassette duplicator to emulate disabled portions of said modified video cassette duplicator, said control means being connected to the tape transport drive means to provide the necessary movement of the tape and tension within the tape, said interface being connected between the control means and the video cassette duplicator for controlling the operation of the tape transport means in response to the actuation of the video tape duplicator control devices.

2. A method of modifying a standard video cassette recorder for real time recording of master programming material, said method comprising the steps of:
   (a) removing the conventional video tape cassette loading mechanism from the video cassette recording station;
   (b) installing a tape transport assembly adjacent the recording station including a pancake supply and takeup reel system, said tape transport assembly including means adjacent the recording station supporting said tape for movement into engagement with the recording head of said recorder; and
   (c) installing an electronic interface for controlling the pancake supply and takeup reels; for supplying conditioning signals to said video cassette recorder and for receiving status signals from said video cassette recorder, whereby the tape transport assembly is driven to transport the tape past the recording head to record multiple copies of a program on the supply reel.

* * * * *